United States Patent [19]

Brown

[11] 4,263,936

[45] Apr. 28, 1981

[54] EROSION RESISTANT CHECK VALVE ASSEMBLY

[75] Inventor: Joe R. Brown, Houston, Tex.

[73] Assignee: Brown Oil Tools, Inc., Houston, Tex.

[21] Appl. No.: 82,801

[22] Filed: Oct. 9, 1979

[51] Int. Cl.³ ............................................. F16K 15/04
[52] U.S. Cl. ................................. 137/496; 137/519.5; 166/328
[58] Field of Search ................ 137/519.5, 533.11, 496; 166/328

[56] References Cited

U.S. PATENT DOCUMENTS

| | | | |
|---|---|---|---|
| 2,191,702 | 2/1940 | Yowell | 137/533.11 X |
| 3,584,645 | 6/1971 | Radig | 137/519.5 |
| 3,850,191 | 11/1974 | Brown | 137/519.5 |

Primary Examiner—William R. Cline
Attorney, Agent, or Firm—Robert A. Felsman

[57] ABSTRACT

An inside blowout preventer assembly for connection into an earth boring drill string has improved features for preventing erosion. The blowout preventer assembly allows downward flow during normal drilling, but prevents upward flow if the flow rate is above a selected amount, to prevent a blowout. The assembly includes a valve body with a longitudinal passage having a throat section. A recess passage intersects the throat section and contains a ball. The ball is movable from the recess passage into the throat section, where it seals against a seat to stop upward flow. An equalizing passage of selected size and configuration extends from the base of the recess passage to the longitudinal passage. The ball is of lesser diameter than the recess passage for allowing downward flow through the recess passage and the equalizing passage. This prevents the ball from being drawn by pressure differential into the throat section during downward flow, reducing turbulence and erosion.

2 Claims, 2 Drawing Figures

# EROSION RESISTANT CHECK VALVE ASSEMBLY

BACKGROUND OF THE INVENTION

1. Field of the Invention

This invention relates in general to check valve assemblies, especially those for preventing upward fluid flow in drill string used in earth boring.

2. Description of the Prior Art

Oil and gas wells are conventionally drilled by rotating a string of drill pipe that supports a bit. Drilling fluid, known as "mud", is pumped down the inner passage of the drill string, through the bit and up the annular passage between the borehole wall and drill pipe. The mud circulates cuttings to the surface and cools the bit. Also, the weight of the mud is adjusted to provide a bottom hole hydrostatic pressure greater than the formation pressure to prevent a "blowout".

If this condition occurs when the surface pump is disconnected from the drill pipe (as when a joint of pipe is being added or the pipe being removed or replaced during a "trip"), a blowout is more likely because the pump cannot be used to exert added pressure to the fluid inside the pipe. Also, heavier fluids with "weighting" materials cannot be quickly pumped through the system to help avert a blowout.

"outside" blowout preventers, which have been marketed and used for years, are presently used to grip the drill pipe at the surface and seal the annulus between the pipe and the wall of the hole. These devices do not prevent the upward flow of mud inside the pipe during a blowout.

"Inside" blowout preventers to prevent flow up the inner passage of the drill string are shown in U.S. Pat. Nos. 3,850,191; 3,850,194; 4,040,441; 4,049,015; 4,088,298; and 4,108,203. In certain of these patents, the device comprises a sub for connection into the string. The sub has a longitudinal passage, with a recess or side pocket on one side and a seat in the passage above the side pocket. A ball is carried in the side pocket during normal drilling. It moves into the longitudinal passage and seats if substantial upward flow exists during a blowout. An equalizing passage, connecting the base of the side pocket with the longitudinal passage below the side pocket, determines the rate of upward flow which will move the ball into the longitudinal passage. The cross-sectional area of the equalizing passage prevents seating of the ball from the normal upward flow caused by running the drill string into the well.

Erosion is a continuing problem with inside blowout preventers of the above prior art description. High flow rates and solids or sand contained in the mud cause erosion of the seat and passages inside the blowout preventer, preventing long-term effective operation. Experience indicates that the ball tends to move partially into the longitudinal passage even during downward fluid flow. In this position the ball causes a flow restriction of varying area due to oscillation of the ball. Turbulent flow and erosion of the passage and ball inevitably result.

This invention relates to solutions to the above problems of the prior art devices.

This invention, like the prior art inside blowout preventers previously discussed, utilizes a ball and seat in the primary or longitudinal passage to prevent the upward flow of fluid. A side pocket or recess receives the ball during downward flow to remove the ball from the primary flow path.

Unlike the prior art assemblies, the recess is appreciably larger in diameter than the ball, enabling fluid to flow downward past the ball, through an equalizing passage and back into the longitudinal passage downstream from the recess and ball. Consequently, when fluid flows downward in a drill string during drilling, some of the fluid flows past the ball in the recess to prevent movement of the ball, even partially, into the primary or longitudinal passage.

When fluid flows upwardly in the drill string, upward flow through the equalizing passage into the recess urges the ball into the longitudinal or primary passage and against a seat.

The check valve assembly is encompassed within an inner member or replaceable core contained by a tubular housing. Inside the core is an offset throat that forms a portion of the longitudinal or primary passage that contains the seat for the ball. The side pocket or recess communicates with the throat and an annular equalizing passage between the replaceable core and the tubular housing.

Addition features, objects and advantages of the invention will become apparent in the following description.

SUMMARY OF THE INVENTION

As in the prior art, the invention utilizes a ball that seats in a longitudinal passage to prevent upward flow during a blowout. A recess or side pocket receives the ball to remove it from the downward flow in the longitudinal passage during normal drilling.

To prevent the ball from being drawn partially into the longitudinal passage during drilling, and to solve the resulting problems of the prior art inside blowout preventors, a replaceable insert is used to form the major portions of the longitudinal passage and the side pocket for the ball. The equalizing passage extending from the side pocket is formed between the body of the assembly and the recess.

As shown in the drawing, the throat of the longitudinal passage, where the seat is located, is offset from center to provide for the side pocket. The equalizing passage is preferably an annular space. The ball is sufficiently smaller than the side pocket to reduce the velocity of the fluid flowing pass the ball and through the equalizer passage. Lower fluid velocities reduce erosion caused by the fluid and the solid particles that are often present in drilling mud. Further, the insert may be easily replaced at the conclusion of its natural life span, without the necessity and cost of replacing the entire assembly. Additional objects, features and advantages will become apparent in view of the following description.

DESCRIPTION OF THE PREFERRED EMBODIMENT

Figure 1:
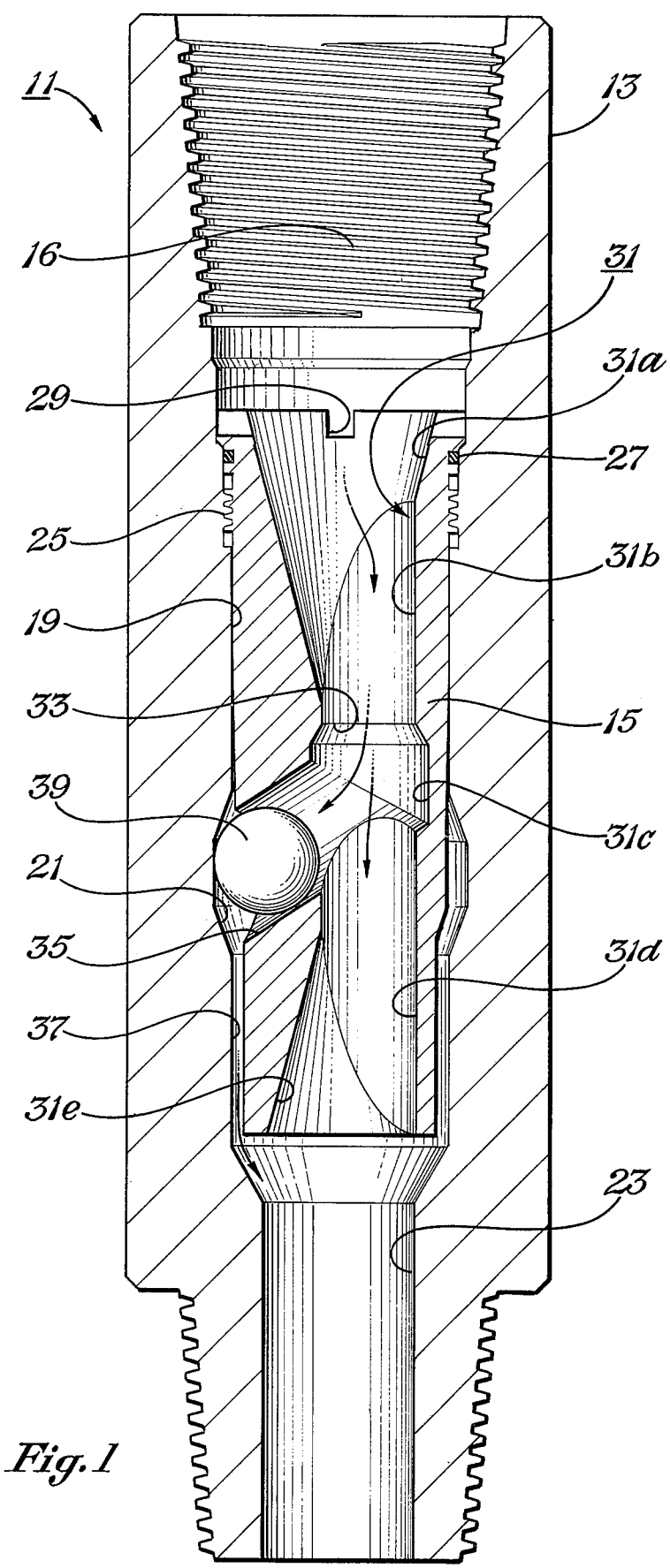
FIG. 1 is a side elevational view in longitudinal section of a check valve assembly and inside blowout preventer constructed in accordance with the invention, and showing the valve in the side pocket or recess under downward flow condition.

Referring initially to FIG. 1, the illustrated inside blowout preventer or check valve assembly 11 has a valve body that is comprised of a tubular body or housing 13 and an inner member or insert 15. The housing 13 is cylindrical, with threaded sections 16 and 17 at its upper and lower ends respectively for connection into a string of drill pipe (not shown). Housing 13 has cylindrical outer walls and an axial bore 19. Bore 19 has an annular enlargement or groove 21. A lower section of bore 19 is of reduced diameter to form an annular or equalizing passage 37.

The inner member 15 is generally cylindrical member secured inside bore 19 by threads 25. A seal 27 near the top of the inner member 15 prevents leakage of drilling fluid past the threads 25. One or more keyways 29 on the top of the inner member 15 receive a wrench (not shown) for tightening and loosening the inner member 15.

Inner member 15 has a longitudinal passage 31 extending through it to serve as the primary passage for drilling fluid. Longitudinal passage 31 has five separate sections. An upper frusto-conical section 31a commences at the top of the member 15, tapering into an upper cylindrical section 31b. A throat section 31c is immediately below the upper cylindrical section 31b and is about midway along the length of the assembly 11. Throat member 31c is a short cylindrical section, larger in diameter than the upper cylindrical section 31b. A beveled intersection between the two sections 31b and 31c serves as a valve seat 33. The throat section 31c extends into a lower cylindrical section 31d. The lower cylindrical section 31d is of the same diameter as the upper cylindrical section 31b.

The cylindrical sections 31b and 31d, and the throat section 31c have a common longitudinal axis that is offcenter from the axis of the bore, but parallel to it. A lower frusto-conical section 31e tapers downwardly from the lower cylindrical section 31d, terminating at the bottom of the inner member 15. The axes of the upper and lower frusto-conical sections are common with the axis of bore 19. The diameters of the frusto-conical sections 31a and 31e, at the top and bottom ends of the inner member 15 are wider than the throat section 31b to avoid sharp discontinuities in the flow path that cause erosion and turbulence.

A cylindrical recess passage or side pocket 35 has a mouth at the throat section 31c, and extends through the side of the inner member 15 at a point farthest from the axis of the throat section 31c. The upper edge of the mouth is below seat 33. The lower edge of the mouth is below the intersection of throat section 31c with lower cylindrical section 31d. The base of the recess passage 35 is below the throat section 31c and is in communication with annular groove 21. Recess passage 35 is cylindrical and of larger diameter than the throat section 31c. The axis of the recess passage 35 intersects the axis of the throat section 31c at preferably about a 35° angle.

The outer diameter of the inner member 15 is substantially the same diameter as bore 19 above the recess passage 35, but is of lesser diameter below the recess passage. The clearance between inner member 15 and bore 19 provides an annular passage 37. This annular or equalizing passage 37 commences at a point above the lower edge of groove 21 and terminates at the bottom of the annular member 19. In a preferred embodiment for one size of drill pipe, bore 19 is 4 inches in diameter, and the outer diameter of the inner member below recess passage 35 is $3\frac{7}{8}$ inches in diameter, resulting in a 1/16 inch annular clearance. Annular passage 37 is exaggerated in the drawing for clarity.

A spherical ball 39 of hard, erosion resistant material is carried in the recess passage 35. Ball 39 is movable in recess passage 35, and can be drawn into the throat section 31c by upward flow in the recess passage to seal against seat 33. Ball 39 has a significantly lesser diameter than recess passage 35, but has a larger diameter than the diameter of the upper and lower cylindrical passages 31b and 31d. In a preferred embodiment for one drill pipe size, ball 39 is 2 inches in diameter, recess passage 39 is $2\frac{3}{4}$ inches in diameter, and upper and lower cylindrical passages 31b and 31d are $1\frac{3}{4}$ inches in diameter. Ball 39 is thus less than 75% the diameter of recess passage 39 to allow substantial downward flow around the ball. The offset of the throat section 31c and the annular groove 21 allow the length of the recess to exceed the diameter of the ball 39. This avoids protrusion of the ball into the longitudinal passage 31 during downward flow. Preferably the axis of the throat section 31c is offset about $\frac{1}{2}$ inch from the axis of the bore 19 for a bore of 4 inches.

In operation and during drilling, mud is circulated down the drill string and through the longitudinal passage 31 at a high rate that may reach approximately 600 gallons per minute. A certain amount of mud will flow through recess passage 35 and around ball 39, as indicated by the arrows in FIG. 1. The fluid enters groove 21 and passes through annular passage 37. Ball 39 is unable to seal against the entrance of annular passage 37, thus cannot prevent downward flow. The flow through annular passage 37 reduces the pressure behind the ball, preventing it from moving into the longitudinal passage 31. Retaining the ball 39 in the recess passage 35 reduces turbulence and erosion in the longitudinal passage 31.

Figure 2:
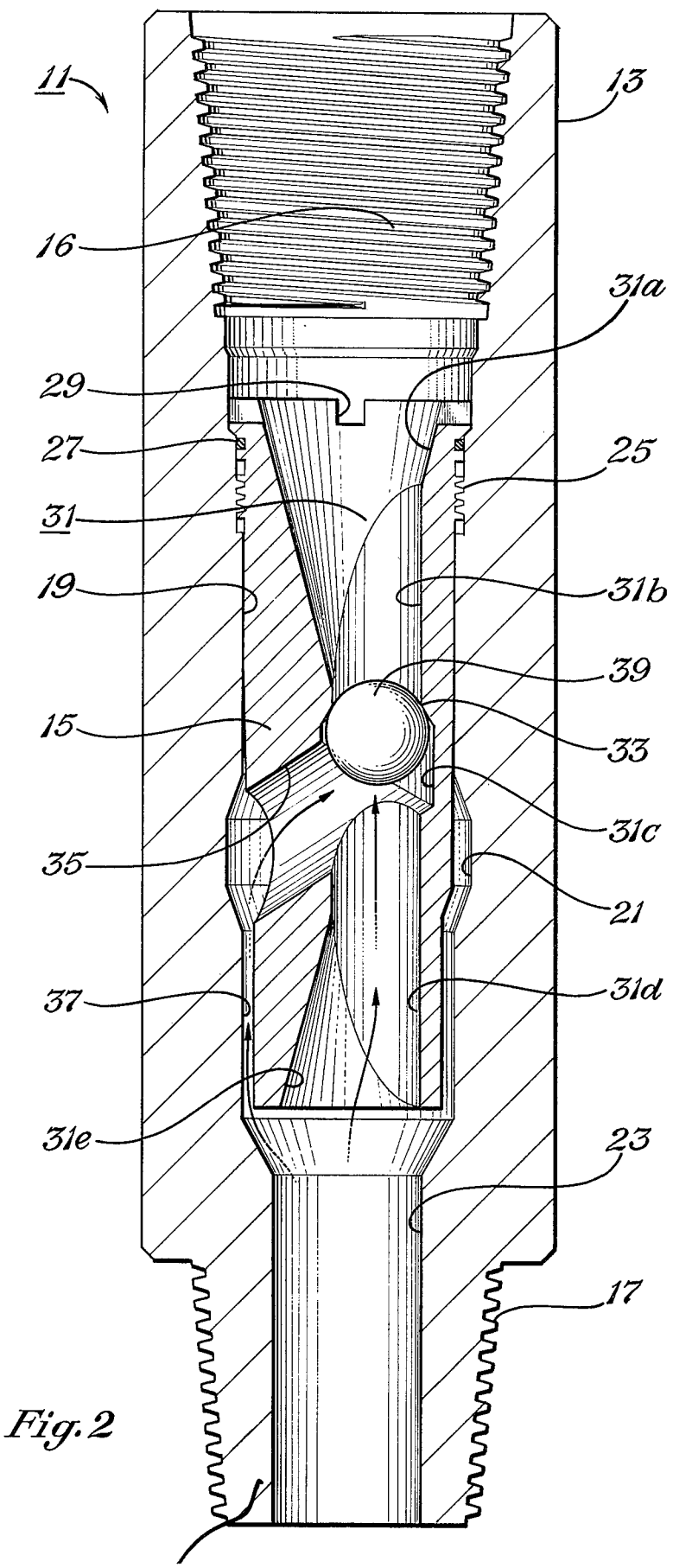
FIG. 2 is a similar view of the assembly of FIG. 1, showing the valve against its seat and blocking upward flow to prevent a blowout of the fluid inside the drill pipe.

Should pressure from fluid in the earth's formations become greater than the hydrostatic pressure of the mud, upward flow will occur in the longitudinal passage 31. If the flow rate is sufficiently high, ball 39 will be forced out into the throat section 31c, where it seals against seat 33. The arrows in FIG. 2 indicate the flow direction prior to seating. Once ball 39 is seated, there will be no additional upward flow. Once the pressure below ball 39 drops below the pressure above ball 39, it will re-enter recess passage 35. It cannot seat against the intrasection of throat section 31c and cylindrical section 31d downward.

The movement of ball 39 into throat section 31c is caused by higher pressure existing at the recess passage 35 than at throat section 31c because of the different flow rates through the throat section and recess passage.

Annular passage 37 serves as equalizing passage means for connecting the longitudinal passage 31 below the throat section 31c with the recess passage 35. Increasing the cross-sectional area of the annular passage 37 requires a higher upward flow rate through longitudinal passage 31 in order to force the ball into the throat section 31c. The cross-sectional area of the annular passage 37 is selected so that ball 39 will not move into the throat section 31b during normal "running-in" of the drill string. During running-in, mud in the borehole will normally enter the string to equalize the pressure inside and outside the drill pipe. About 75 to 100 gallons per minute is the maximum flow rate expected to occur during running in. Thus the minimum upward flow rate before ball 39 will move into the longitudinal passage 31 should be about 100 gallons per minute.

It should be apparent that an invention having significant advantages has been provided. The flow passage provided around the ball in the recess passage effectively prevents the ball from entering the longitudinal passage during downward flow. Turbulence and the resulting erosion are reduced. Also, constructing the valve body with a separate inner member and housing results in a less complicated and more easily constructed tool.

While the invention has been shown in only one of its forms, it should be apparent to those skilled in the art that it is not so limited but is susceptible to various changes and modifications without departing from the spirit thereof.

I claim:

1. A check valve assembly especially suitable for use in a drill string as an inside blowout preventer which comprises:
    a valve body having upper and lower ends for connection into the drill string, and an axial bore;
    a longitudinal passage inside the valve body for the flow of fluid and which includes a ball valve seat;
    a ball valve contained by the valve body downstream of the valve seat to engage the valve seat and prevent upward fluid flow of a predetermined rate;
    a recess passage communicating with the longitudinal passage to receive the ball valve during downward flow, the passage being larger than the diameter of the ball by a predetermined quantity;
    an annular pressure equalizing passage means of a selected size communicating between the recess passage and the longitudinal passage downstream of the ball valve to enable the fluid to flow at selected rates past the ball and through the recess passage and distribute flow around the inside of the valve body;
    whereby fluid will flow downwardly through the recess at a rate to prevent the ball from partially restricting the longitudinal passage during drilling and minimize erosion of the valve body.

2. A check valve assembly especially suitable for use in a drill string as an inside blowout preventer which comprises:
    a valve body having upper and lower ends for connection into the drill string, and an axial bore;
    an insert adapted for removable securement inside the axial bore of the valve body;
    a longitudinal passage in the insert for the flow of fluid and which includes a ball valve seat;
    a ball valve contained by the insert downstream of the valve seat to engage the valve seat and prevent upward fluid flow at a predetermined rate;
    a recess passage communicating with the longitudinal passage to receive the ball valve during downward flow, the passage being larger than the diameter of the ball by a predetermined quantity;
    an annular pressure equalizing passage means of a selected size between the insert and the valve body communicating between the recess passage and the longitudinal passage downstream of the ball valve to enable the fluid to flow at selected rates past the ball and through the recess passage;
    whereby fluid will flow downwardly through the recess at a rate to prevent the ball from partially restricting the longitudinal passage during drilling and minimize erosion of the valve body and insert.

* * * * *